United States Patent
Chiang et al.

(10) Patent No.: US 7,738,580 B2
(45) Date of Patent: Jun. 15, 2010

(54) QUADRATURE AMPLITUDE MODULATION TRELLIS CODED MODULATION DECODING APPARATUS AND METHOD THEREOF

(75) Inventors: Jung-Tang Chiang, Hsin-Chu (TW); Hou-Wei Lin, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1011 days.

(21) Appl. No.: 11/422,335

(22) Filed: Jun. 6, 2006

(65) Prior Publication Data
US 2006/0274845 A1    Dec. 7, 2006

(30) Foreign Application Priority Data
Jun. 7, 2005    (TW) ............... 94118793 A

(51) Int. Cl.
H04L 5/12 (2006.01)
(52) U.S. Cl. ............ 375/261; 375/262; 375/265; 375/341; 704/242; 714/792; 714/795
(58) Field of Classification Search ......... 375/260, 375/261, 341; 714/789
See application file for complete search history.

(56) References Cited
U.S. PATENT DOCUMENTS
5,416,801 A * 5/1995 Chouly et al. .......... 375/260
5,740,203 A * 4/1998 Ramaswamy et al. ...... 375/341
6,233,712 B1 * 5/2001 Rhee et al. .............. 714/789

OTHER PUBLICATIONS
"Series J: Transmission of Television, Sound Programme and other Multimedia Signals, Digital transmission of television signals, Digital multi-programme systems for television, sound and data services for cable distribution". Telecommunication Standardization Sector of ITU. Apr. 1997. pp. 183-i-iii, 1-60. ITU-T Recommendation .183. International Telecommunication Union.

* cited by examiner

Primary Examiner—David C Payne
Assistant Examiner—Adolf Dsouza
(74) Attorney, Agent, or Firm—Thomas, Kayden, Horstemeyer & Risley

(57) ABSTRACT

A quadrature amplitude modulation trellis coded modulation (QAM-TCM) decoding apparatus and the related method that receives and decodes a QAM signal. The QAM-TCM decoding apparatus includes an in-phase least significant bit (LSB) decoding path, which includes a in-phase Viterbi decoder for executing a decoding procedure on at least one LSB corresponding to an in-phase component of the QAM signal, a quadrature-phase LSB decoding path, which includes a quadrature-phase Viterbi decoder for executing a decoding procedure on at least one LSB corresponding to a quadrature-phase component of the QAM signal, and a most significant bit (MSB) decoding path for executing a decoding procedure on MSB portions corresponding to the in-phase or the quadrature-phase of the QAM signal.

20 Claims, 3 Drawing Sheets

QUADRATURE AMPLITUDE MODULATION TRELLIS CODED MODULATION DECODING APPARATUS AND METHOD THEREOF

BACKGROUND OF THE INVENTION

1. Field of the Invention

The present invention provides a decoding apparatus and method thereof, and more particularly, the present invention provides a quadrature amplitude modulation trellis coded modulation (QAM-TCM) apparatus and related decoding method thereof.

2. Description of the Prior Art

Please refer to FIG. 1. FIG. 1 illustrates a functional block diagram of a 64 quadrature amplitude modulation trellis coded modulation (QAM-TCM) encoding apparatus 10. The QAM-TCM encoding apparatus 10 includes a parser 20, a differential encoder 22, a convolutional encoder 24, a puncturing unit 26, and a QAM mapper 28. Firstly, after the parser 20 receives four symbols RS1, RS2, RS3, RS4 sequentially, the parser 20 rearranges and then outputs the bits of the symbols RS1, RS2, RS3, RS4. For example, assume that the symbols RS1 includes seven bits, which are: $I_1, I_2, I_4, I_5, I_7, I_8, I_{10}$; the symbol RS2 includes seven bits, which are: $I_{11}, I_{12}, I_{13}, I_0, I_3, I_6, I_9$; the symbol RS3 includes the seven bits, which are: $Q_1, Q_2, Q_4, Q_5, Q_7, Q_8, Q_{10}$; and the symbol RS4 includes the seven bits, which are: $Q_{11}, Q_{12}, Q_{13}, Q_0, Q_3, Q_6, Q_9$. After the parser 20 receives the symbols RS1, RS2, RS3, RS4, the parser 20 outputs two sets of in-phase bits $I_2, I_5, I_8, I_{11}, I_{13}$ and $I_1, I_4, I_7, I_{10}, I_{12}$, two sets of quadrature-phase bits $Q_2, Q_5, Q_8, Q_{11}, Q_{13}$ and $Q_1, Q_4, Q_7, Q_{10}, Q_{12}$, four in-phase bits $I_0, I_3, I_6, I_9$, and four quadrature-phase bits $Q_0, Q_3, Q_6, Q_9$. Next, the differential encoder 22 executes encoding on the four in-phase bits $I_0, I_3, I_6, I_9$ and the four quadrature-phase bits $Q_0, Q_3, Q_6, Q_9$ to generate a set of in-phase and a set of quadrature-phase bits I' and Q' respectively as shown in FIG. 1. Please continue to refer to FIG. 1. The convolutional encoder 24 then encodes the set of in-phase and the set of quadrature-phase bits I' and Q' respectively to further generate a set of in-phase and a set of quadrature-phase bits I" and Q" respectively. Please note that since the convolutional encoder 24 executes encoding with a 1/2 ratio, the number of bits of the set of in-phase bits I" or that of the set of quadrature-phase bits Q" is twice the number of the set of in-phase bits I' or that of the set of quadrature-phase bits Q'. In other words, this means that each of I" and Q" has 8 bits. Please continue to refer to FIG. 1. Next, the puncturing unit 26 punctures, or removes, three bits from each set of in-phase and quadrature-phase bits I" and Q" to generate a set of in-phase encoded bits $I_{ec}$ and a set of quadrature-phase encoded bits $Q_{ec}$. Please note that each of these sets has 5 bits. Lastly, the QAM mapper 28 executes a mapping procedure by inputting two sets of in-phase bits, which are: $I_2, I_5, I_8, I_{11}, I_{13}$ and $I_1, I_4, I_7, I_{10}, I_{12}$, two sets of quadrature-phase bits, which are: $Q_2, Q_5, Q_8, Q_{11}, Q_{13}$ and $Q_1, Q_4, Q_7, Q_{10}, Q_{12}$, and finally the set of in-phase encoded bits $I_{ec}$ and the set of quadrature-phase encoded bits $Q_{ec}$ to generate an in-phase bit flow X and a quadrature-phase bit flow Y. For example, the QAM mapper 28 first executes the mapping procedure on a sequence of input bits $I_1, I_2, I_{ec1}$ and a sequence of input bits $Q_1, Q_2, Q_{ec1}$ to generate a set of in-phase bits $X^1$ and a set of quadrature-phase bits $Y^1$. Next, the QAM mapper 28 executes the mapping procedure on a sequence of input bits $I_4, I_5, I_{ec2}$ and a sequence of input bits $Q_4, Q_5, Q_{ec2}$ to generate a set of in-phase bits $X^2$ and a set of quadrature-phase bits $Y^2$. Hence, each set of in-phase bits: $X^1, \ldots, X^n$ forms the above mentioned in-phase bit flow X, and each set of the quadrature-phase bits: $Y^1, \ldots, Y^n$ forms the above mentioned quadrature-phase bit flow Y. As was mentioned previously, the QAM-TCM decoding technology is well known to those possessing average skilled in the pertinent art. Additionally, for reference regarding this topic one may also refer to the detailed descriptions in articles such as, "Digital Multi-Programme Systems for Television, Sound and Data Services for Cable Distribution", ITU-T Recommendation J.83, whose contents are incorporated herein by reference in its entirety. Therefore, given the wealth of prior art knowledge not further reiteration is necessary herein.

Furthermore, it is to be noted that U.S. Pat. No. 6,233,712 discloses a QAM-TCM decoding apparatus, the apparatus executes depuncturing, Viterbi decoding procedures on all bits of the in-phase, quadrature-phase bit flow X, Y received directly through a transmission channel. This decoding process leads to a significant amount of calculation, and hence increases the computational complexity of the decoding calculation.

SUMMARY OF THE INVENTION

The present invention provides a quadrature amplitude modulation trellis coded modulation (QAM-TCM) decoding apparatus and method thereof; one object of which is to reduce the complexity of the decoding calculation.

An embodiment of the present invention discloses a QAM-TCM apparatus for receiving and decoding a QAM signal. The QAM-TCM comprises an in-phase least significant bit (LSB) decoding path for executing a decoding procedure on at least one LSB corresponding to the in-phase component of the QAM signal. The in-phase LSB decoding path comprises an in-phase LSB demapper utilized for executing a demapping procedure on the QAM signal to generate at least the one LSB corresponding to the in-phase component of the QAM signal; a quadrature-phase LSB decoding path for executing a decoding procedure on at least one LSB corresponding to the quadrature-phase component of the QAM signal, the quadrature-phase LSB decoding path comprises a quadrature-phase LSB demapper utilized for executing a demapping procedure on the QAM signal to generate at least the one LSB corresponding to the quadrature-phase component of the QAM signal; and a most significant bit (MSB) decoding path for executing a decoding procedure on MSB portions corresponding to the in-phase component and the quadrature-phase component of the QAM signal.

An embodiment of the present invention discloses a quadrature amplitude modulation trellis coded modulation (QAM-TCM) decoding apparatus for receiving and decoding an QAM signal. The QAM-TCM comprises an in-phase least significant bit (LSB) decoding path comprising an in-phase Viterbi decoder for executing a Viterbi decoding procedure on at least one LSB corresponding to the in-phase component of the QAM signal; a quadrature-phase LSB decoding path comprises a quadrature-phase Viterbi decoder for executing a Viterbi decoding procedure on at least one LSB corresponding to the quadrature-phase component of the QAM signal; and a most significant bit (MSB) decoding path for executing a decoding procedure on MSB portions corresponding to the in-phase component and the quadrature-phase component of the QAM signal.

An embodiment of the present invention discloses a quadrature amplitude modulation trellis coded modulation (QAM-TCM) decoding apparatus for receiving and decoding a QAM signal. The QAM-TCM comprises a least significant bit (LSB) module utilized for executing a decoding procedure on at least one LSB corresponding to an in-phase component of the QAM signal according to the QAM signal, and for executing a decoding procedure on the at least one LSB corresponding to a quadrature-phase component of the QAM signal according to the QAM signal; a most significant bit (MSB) decoding module utilized for executing a decoding procedure on MSB portions corresponding to the in-phase component and the quadrature-phase component of the QAM signal; a re-encoding and puncturing module coupled to the LSB decoding module utilized for executing a re-encoding and puncturing procedure according to an output signal of the LSB decoding module; and a synchronization module coupled to the LSB decoding module and the re-encoding and puncturing module utilized for executing a synchronization procedure of the LSB decoding module and the re-encoding and puncturing module.

An embodiment of the present invention discloses a quadrature amplitude modulation trellis coded modulation (QAM-TCM) decoding method. The method comprises receiving a QAM signal; executing an in-phase Viterbi decoding procedure on at least one least significant bit (LSB) corresponding to the in-phase component of the QAM signal; executing a quadrature-phase Viterbi decoding procedure utilized for obtaining at least the one LSB corresponding to the quadrature-phase component of the QAM signal; executing an in-phase re-encoding and puncturing procedure on the result of the in-phase Viterbi decoding procedure; executing an in-phase re-encoding and puncturing procedure to obtain the result of the quadrature-phase Viterbi decoding procedure; and finally executing a decoding procedure to obtain most significant bit (MSB) portions corresponding to the in-phase component and the quadrature-phase component of the QAM signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, consumer electronic equipment manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." The terms "couple" and "couples" are intended to mean either an indirect or a direct electrical connection. Thus, if a first device couples to a second device, that connection may be through a direct electrical connection, or through an indirect electrical connection via other devices and connections.

A description of the present invention utilizes a 64-QAM-TCM decoding operation of a digital television as an example. The related standards can be referenced in the article "Digital Multi-Programme Systems for Television, Sound and Data Services for Cable Distribution", ITU-T Recommendation J.83. One of average skilled in the art pertaining to QAM-TCM decoding technology will understand that the technology disclosed in the present invention can also be applied in many other areas of application and technology, and is in no way intended to be limited to only the digital television arena. Speaking beyond the 64-QAM systems, the technology disclosed in the present invention can also be applied to a 256-QAM as well as many other standards as long as not deviating from the spirit of the present invention.

Figure 1:
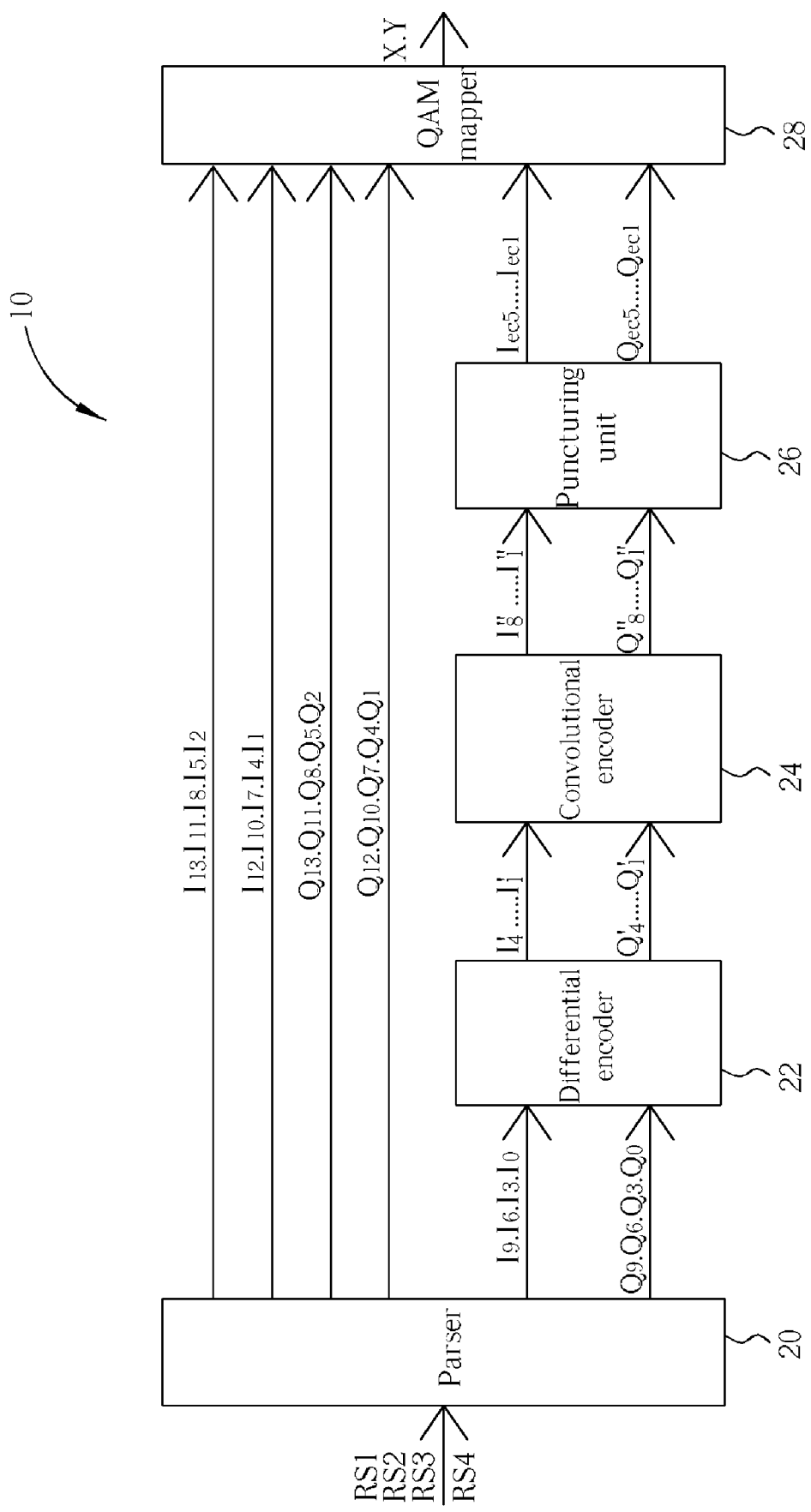
FIG. 1 illustrates a functional block diagram of a quadrature amplitude modulation trellis coded modulation (QAM-TCM) encoding apparatus.
Figure 2:
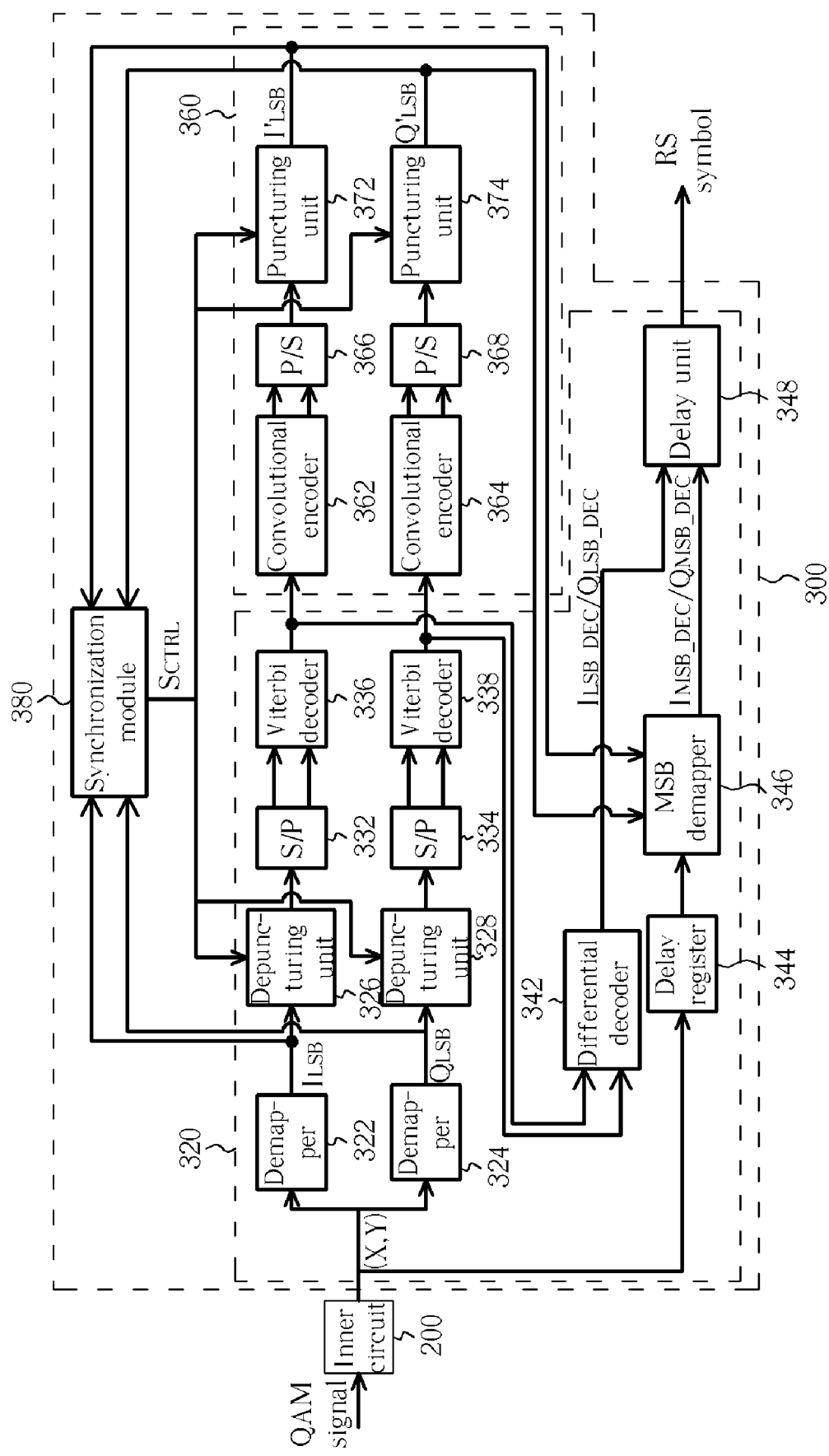
FIG. 2 illustrates a functional block diagram of a QAM-TCM decoding apparatus according to an embodiment of the present invention.

Please refer to FIG. 2. FIG. 2 illustrates a functional block diagram of a QAM-TCM decoding apparatus 10 of a digital television according to an embodiment of the present invention. After the digital television receives QAM signals through a transmission channel, an inner circuit 200 of the digital television will perform a procedure, for example, a demodulation procedure on the QAM signals. Next, the processed QAM signals (X, Y) are transmitted to an outer circuit 300 of the digital television for the purpose of executing a QAM-TCM decoding procedure. These steps are executed in this particular order so that the RS symbols can be recovered to its original form at the signal source before encoding. Please note that for illustrative and descriptive convenience and clarity, the QAM signal generated by the outer circuit 300 and the signal generated after encoding utilize the same label: (X, Y). Those possessing average skill in the art will understand however, that after the signal passes through the transmission channel, the signal will inevitably be affected and altered by the transmission condition of the channel.

Please continue to refer to FIG. 2. As shown in FIG. 2, the outer circuit 300 of the digital television is formed by three components. Said components are: a decoding module 320, a re-encoding and puncturing module 360, and a synchronization module 380. Insofar as the decoding module 320 executes a decoding procedure according to the QAM signal (X, Y) from the inner circuit 200. In the present embodiment, the decoding module 320 includes two paths of a least significant bit (LSB) decoding procedure and a most significant bit (MSB) decoding procedure. The results of the two paths are combined to obtain a recovered RS symbol. Next, the re-encoding and puncturing module 360 then executes a convolutional encoding and puncturing procedure on the intermediate products of the decoding module 320 to generate the information required by the synchronization module 380 for later executing a synchronization procedure. Lastly, the synchronization module 380 synchronizes the operations of the decoding module 320 and the re-encoding and puncturing module 360 according to signal values of the decoding module 320 and the output signal of the re-encoding and puncturing module 360.

Please continue to refer to FIG. 2. In the above-mentioned, the decoding module 320 of the embodiment includes an LSB decoding path and an MSB decoding path, wherein the LSB decoding path further includes an in-phase (I) branch and a quadrature-phase (Q) branch. First, the QAM signal (X, Y) is transmitted to an in-phase LSB demapper 322 and a quadrature-phase LSB demapper 324 for executing a de-mapping procedure respectively on the I/Q path to generate an $I_{LSB}$ of the in-phase portion and a $Q_{LSB}$ of the quadrature-phase portion. In order to minimize the computational complexity of the latter decoding calculation in this embodiment, the $I_{LSB}$ and the $Q_{LSB}$ generated by the demappers 322, 324 is at least 1 bit of the I/Q component. However, the present invention is not limited to the above-mentioned. These specifics are provided for illustrative purposes and examples only and do not serve as limitations of the present invention. Next, the $I_{LSB}$ and $Q_{LSB}$ are respectively transmitted to an in-phase LSB depuncturing unit and a quadrature-phase LSB depuncturing unit for executing a depuncturing procedure to compensate for a plurality of bits. Once the results are generated and supplied to and through the serial-to-parallel converters 332, 334, the results are then inputted to a 1/2 ratio in-phase Viterbi decoder 336 and a 1/2 ratio quadrature-phase Viterbi decoder 338 respectively for executing a Viterbi decoding procedure. The results, after passing through the Viterbi decoders 336, 338, will be inputted into a differential decoder 342 for post-decoding. Lastly, an $I_{LSB\_DEC}$ of the in-phase portion after decoding and a $Q_{LSB\_DEC}$ of the quadrature-phase portion after decoding are generated.

Please continue to refer to FIG. 2. The decoding results outputted by the Viterbi decoders 336, 338 are transmitted to the differential decoder 342 as well as to the re-encoding and puncturing module 360. The re-encoding and puncturing module 360 is also split into an in-phase branch and a quadrature-phase branch, the decoding results of the Viterbi decoders 336, 338 will be respectively inputted into a 1/2 ratio in-phase convolutional encoder 362 and a 1/2 ratio quadrature-phase convolutional encoder 364 utilized for executing a re-encoding procedure. Next, after passing through parallel-to-serial converters 366, 368, the re-encoded results will pass through a puncturing procedure of an in-phase LSB puncturing unit 372 and a quadrature-phase LSB puncturing unit 374 to remove a plurality of bits. Lastly, an $I'_{LSB}$ of the in-phase portion and a $Q'_{LSB}$ of the quadrature-phase portion are generated after re-encoding and puncturing. Said generated results ($I'_{LSB}$, $Q'_{LSB}$) can be utilized as a reference for the synchronization module to execute the synchronization procedure, and can also be utilized as a reference for the MSB decoding path of the decoding module 320 to execute a demapping procedure.

Please continue to refer to FIG. 2. Regarding the MSB decoding path of the decoding module 320, the QAM signal (X, Y), in addition to being transmitted to the LSB decoding path and utilized for executing LSB decoding, is also being transmitted to the MSB decoding path for executing MSB decoding. In this embodiment, because the LSB of the I, Q components each include one bit, consequently the MSB includes the remainder of the bits. For example, for a 64-QAM system the MSB of the I, Q components each includes 2 bits, and for a 256-QAM system the MSB of the I, Q components includes 3 bits. (X, Y) is first delayed by a delay unit 348 for a predetermined period of time. This is desirable to ensure that the data in the MSB decoding path and the LSB decoding path are synchronized. Next, the MSB demapper 346 executes the demapping procedure on the delayed (X, Y) to generate an $I_{MSB\_DEC}$ of the in-phase portion and a $Q_{MSB\_DEC}$ of the quadrature-phase. In this embodiment, when the MSB demapper 346 executes the demapping procedure on the (X, Y), the MSB demapper 346 first refers to ($I'_{LSB}$, $Q'_{LSB}$) before determining which constellation point sub-group to be used for performing the demapping. In this embodiment, because the $I'_{LSB}$ and the $Q'_{LSB}$ each includes one bit, the MSB demapper 346 can select a sub-group from four constellation point sub-groups according to the set of ($I'_{LSB}$, $Q'_{LSB}$) for performing demapping.

Please continue to refer to FIG. 2. After obtaining decoding results ($I_{LSB\_DEC}$, $Q_{LSB\_DEC}$) and ($I_{MSB\_DEC}$, $Q_{MSB\_DEC}$) respectively from the LSB decoding path and the MSB decoding path, these results are transmitted to a bit ordering unit 348 for executing a sorting procedure conforming to the ITU-T Recommendation J.83 standards to obtain a recovered RS symbol. Lastly, with respect to the synchronization module 380, the synchronization module 380 calculates, respectively, the correlation between the $I_{LSB}$ and $I'_{LSB}$, and the correlation between the $Q_{LSB}$ and $Q'_{LSB}$. When the correlation of the in-phase or the correlation of the quadrature-phase has not reached a predetermined threshold value, the synchronization module 380 will transmit a synchronization signal $S_{CTRL}$ to the in-phase LSB depuncturing unit 326, the quadrature-phase LSB depuncturing unit 328, the in-phase puncturing unit 372, and the quadrature-phase LSB puncturing unit 374 for the purpose of executing a re-synchronization procedure of the named functional blocks.

Figure 3:
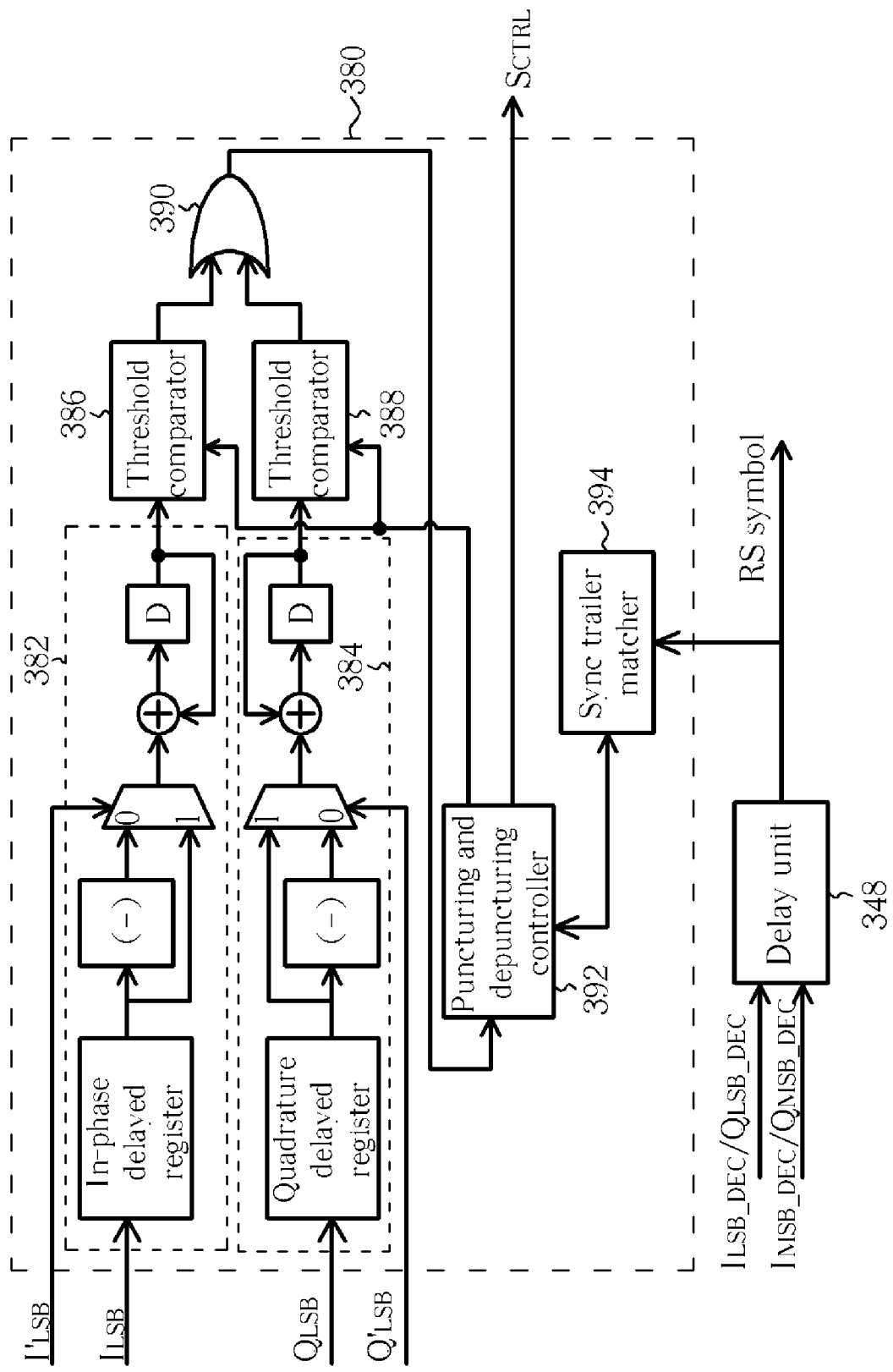
FIG. 3 illustrates a detailed functional block diagram of the synchronization module illustrated in FIG. 2.

Please refer to FIG. 3. FIG. 3 illustrates a diagram of a synchronization module 380 according to an embodiment of the present invention. The synchronization module 380 includes an in-phase correlation unit 382 and a quadrature-phase correlation unit 384. The correlation of the in-phase and the correlation of the quadrature-phase will be determined and transmitted, respectively, to an in-phase threshold comparator 386 and a quadrature threshold comparator 388 for comparing with an in-phase threshold value and a quadrature-phase threshold value. Next, the comparison result is transmitted to a puncturing and depuncturing controller 392 through an OR gate 390 to determine whether the synchronization signal $S_{CTRL}$ is to be issued. In this embodiment, the puncturing and depuncturing controller 392 is used for adjusting the size of the in-phase threshold value 386 and the quadrature-phase threshold value 388. Furthermore, the synchronization module 380 includes a sync trailer matcher 394 utilized for executing a sync trailer matching procedure conforming to the ITU-T Recommendation J.83.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Quadrature Amplitude Modulation Trellis Coded Modulation (QAM-TCM) decoding apparatus for receiving and decoding a QAM signal, the QAM-TCM apparatus comprising:

an in-phase least significant bit (LSB) decoding path for executing a decoding procedure on at least one LSB corresponding to the in-phase component of the QAM signal, the in-phase LSB decoding path comprising an in-phase LSB demapper for executing a demapping procedure on the QAM signal to generate the at least one LSB corresponding to the in-phase component of the QAM signal;

a quadrature-phase LSB decoding path for executing a decoding procedure on at least one LSB corresponding to the quadrature-phase component of the QAM signal, the quadrature-phase LSB decoding path comprising a quadrature-phase LSB demapper for executing a demapping procedure on the QAM signal to generate the at least one LSB corresponding to the quadrature-phase component of the QAM signal; and a most significant bit (MSB) decoding path for executing a decoding procedure on MSB portions corresponding to the in-phase component and the quadrature-phase component of the QAM signal.

2. The QAM-TCM decoding apparatus of claim 1 wherein the in-phase LSB decoding path comprises an in-phase LSB depuncturing unit for executing a depuncturing procedure on the LSB corresponding to the in-phase component, the quadrature-phase LSB decoding path comprises a quadrature-phase LSB depuncturing unit for executing a depuncturing procedure on the LSB corresponding to the quadrature-phase component.

3. The QAM-TCM decoding apparatus of claim 1 wherein the in-phase LSB decoding path comprises an in-phase LSB Viterbi decoder for executing a Viterbi decoding procedure on the LSB corresponding to the in-phase component, the quadrature-phase LSB decoding path comprises a quadrature-phase LSB Viterbi decoder for executing a Viterbi decoding procedure on the LSB corresponding to the quadrature-phase component.

4. The QAM-TCM decoding apparatus of claim 1 further comprising a re-encoding and puncturing module coupled to the in-phase LSB decoding path and the quadrature-phase LSB decoding path.

5. The QAM-TCM decoding apparatus of claim 4 wherein the MSB decoding path comprises an MSB demapper for executing a demap procedure on the QAM signal according to an output signal of the re-encoding and puncturing module.

6. A Quadrature Amplitude Modulation Trellis Coded Modulation (QAM-TCM) decoding apparatus for receiving and decoding an QAM signal, the QAM-TCM apparatus comprising:
an in-phase least significant bit (LSB) decoding path comprising an in-phase Viterbi decoder for executing a Viterbi decoding procedure on at least one LSB corresponding to the in-phase component of the QAM signal;
a quadrature-phase LSB decoding path comprising a quadrature-phase Viterbi decoder for executing a Viterbi decoding procedure on at least one LSB corresponding to the quadrature-phase component of the QAM signal; and
a most significant bit (MSB) decoding path for executing a decoding procedure on MSB portions corresponding to the in-phase component and the quadrature-phase component of the QAM signal.

7. The QAM-TCM decoding apparatus of claim 6 wherein the in-phase LSB decoding path comprises an in-phase LSB depuncturing unit for executing a depuncturing procedure on the LSB corresponding to the in-phase component, the quadrature-phase LSB decoding path comprises a quadrature-phase LSB depuncturing unit for executing a depuncturing procedure on the LSB corresponding to the quadrature-phase component.

8. The QAM-TCM decoding apparatus of claim 6 wherein the in-phase LSB decoding path comprises an in-phase LSB demapper for executing a demapping procedure on the LSB corresponding to the in-phase component, the quadrature-phase LSB decoding path comprises a quadrature-phase LSB demapper for executing a demapping procedure on the LSB corresponding to the quadrature-phase component.

9. The QAM-TCM decoding apparatus of claim 6 further comprising a re-encoding and puncturing module coupled to the in-phase LSB decoding path and the quadrature-phase LSB decoding path.

10. The QAM-TCM decoding apparatus of claim 9 further comprising a synchronization module coupled to the in-phase LSB decoding path, the quadrature-phase LSB decoding path, and the re-encoding and puncturing module, for executing a synchronization procedure of the in-phase LSB decoding path, the quadrature-phase LSB decoding path, and the re-encoding and puncturing module.

11. A Quadrature Amplitude Modulation Trellis Coded Modulation (QAM-TCM) decoding apparatus for receiving and decoding a QAM signal, the QAM-TCM apparatus comprising:
a least significant bit (LSB) module for executing a decoding procedure on at least one LSB corresponding to an in-phase component of the QAM signal according to the QAM signal, and executing a decoding procedure on the at least one LSB corresponding to a quadrature-phase component of the QAM signal according to the QAM signal;
a most significant bit (MSB) decoding module for executing a decoding procedure on MSB portions corresponding to the in-phase component and the quadrature-phase component of the QAM signal;
a re-encoding and puncturing module coupled to the LSB decoding module for executing a re-encoding and puncturing procedure according to an output signal of the LSB decoding module; and
a synchronization module coupled to the LSB decoding module and the re-encoding and puncturing module for executing a synchronization procedure of the LSB decoding module and the re-encoding and puncturing module.

12. The QAM-TCM decoding apparatus of claim 11 wherein the LSB decoding module comprises an in-phase Viterbi decoder and a quadrature-phase Viterbi decoder.

13. The QAM-TCM decoding apparatus of claim 11 wherein the LSB decoding module comprises a differential decoder.

14. The QAM-TCM decoding apparatus of claim 11 wherein the LSB decoding module comprises an in-phase LSB demapper and a quadrature-phase LSB demapper.

15. The QAM-TCM decoding apparatus of claim 14 wherein the synchronization module executes the synchronizing procedure according to the demapping result of the in-phase LSB demapper and the quadrature-phase LSB demapper and the re-encoding and puncturing result of the re-encoding and puncturing module.

16. A Quadrature Amplitude Modulation Trellis Coded Modulation (QAM-TCM) decoding method, comprising:
receiving a QAM signal;
executing an in-phase Viterbi decoding procedure on at least one least significant bit (LSB) corresponding to the in-phase component of the QAM signal;
executing a quadrature-phase Viterbi decoding procedure on the at least one LSB corresponding to the quadrature-phase component of the QAM signal;
executing an in-phase re-encoding and puncturing procedure on the result of the in-phase Viterbi decoding procedure;
executing an in-phase re-encoding and puncturing procedure on the result of the quadrature-phase Viterbi decoding procedure; and
executing a decoding procedure on most significant bit (MSB) portions corresponding to the in-phase component and the quadrature-phase component of the QAM signal.

17. The QAM-TCM decoding method of claim 16 further comprising:
executing an in-phase demapping procedure on the QAM signal to generate the LSB of the in-phase component; and
executing a quadrature-phase demapping procedure on the QAM signal to generate the LSB of the quadrature-phase component.

18. The QAM-TCM decoding method of claim 17 further comprising:
executing an in-phase LSB depuncturing procedure on the LSB of the in-phase component; and executing a quadrature-phase LSB depuncturing procedure on the LSB of the quadrature-phase.

19. The QAM-TCM decoding method of claim 18 further comprising:

executing a synchronization procedure of the in-phase LSB depuncturing procedure, the quadrature-phase LSB depuncturing procedure, the in-phase re-encoding and puncture proceduring, and the quadrature-phase re-encoding and puncturing procedure according the LSB of the in-phase component, the LSB of the quadrature-phase component, and the result of the in-phase re-encoding and puncturing procedure and the result of the quadrature-phase re-encoding and puncturing procedure.

20. The QAM-TCM decoding method of claim 16 wherein the MSB decoding procedure comprises:

executing a demapping procedure on the QAM signal according to the result of the in-phase re-encoding and puncturing procedure and the result of the quadrature-phase re-encoding and puncturing procedure.

* * * * *